US 6,554,666 B2

(12) United States Patent
Kabakov

(10) Patent No.: US 6,554,666 B2
(45) Date of Patent: Apr. 29, 2003

(54) PROPULSION APPARATUS FOR MARINE VESSELS

(76) Inventor: Vladimir M. Kabakov, 4600 S. Four Mile Run Dr., Apt. 1201, Arlington, VA (US) 22204

( * ) Notice: Subject to any disclaimer, the term of this patent is extended or adjusted under 35 U.S.C. 154(b) by 0 days.

(21) Appl. No.: 10/093,731

(22) Filed: Mar. 11, 2002

(65) Prior Publication Data

US 2002/0142681 A1 Oct. 3, 2002

Related U.S. Application Data

(63) Continuation-in-part of application No. PCT/US01/16526, filed on Jul. 17, 2001.

(51) Int. Cl.⁷ .............................................. B63H 1/08
(52) U.S. Cl. ........................................ 440/93; 416/110
(58) Field of Search ......................... 440/90, 92, 93; 244/9, 19, 20, 70; 416/10

(56) References Cited

U.S. PATENT DOCUMENTS

| 1,450,454 A | * | 4/1923 | Roney | 244/70 |
| 1,667,140 A | * | 4/1928 | Clark | 416/110 |
| 3,270,820 A | * | 9/1966 | Frazier | 416/110 |
| 6,224,441 B1 | * | 5/2001 | Kabakov | 440/93 |
| 6,227,483 B1 | * | 5/2001 | Therriault | 244/20 |
| 6,352,458 B2 | * | 3/2002 | Kabakov | 440/93 |

FOREIGN PATENT DOCUMENTS

| GB | 217223 | * | 9/1924 | 440/93 |
| WO | WO 02/08054 | * | 1/2002 | |

* cited by examiner

Primary Examiner—Sherman Basinger

(57) ABSTRACT

An outboard apparatus for propelling marine vessels includes a horizontal driving shaft, a rotated planetary gear-box and four propelling blades disposed over the surface of the water. During the rotation of the driving shaft, the blades extend into the water when their orientations are changed from horizontal to vertical positions. A propulsive force is developed as a result of a double rotation of the blades with the same speed around intercrossed axes of the driving shaft and radial shafts of the gear-box. During each propulsion stroke, circumferential velocities of the blades are gradually accelerated when they move downward. Both sides of the blades are used consecutively as working surfaces. Disposed with variable angles of incidence, the propelling blades work simultaneously as paddles and as blades of a screw propeller. The propulsion apparatus can also be used in typical outboard engines instead of the traditional screw propellers. Two vertical driving shafts with gear-boxes and propelling blades are mounted in the extension case of the outboard engine and rotated in opposite directions for developing a unidirectional propulsive force.

17 Claims, 7 Drawing Sheets

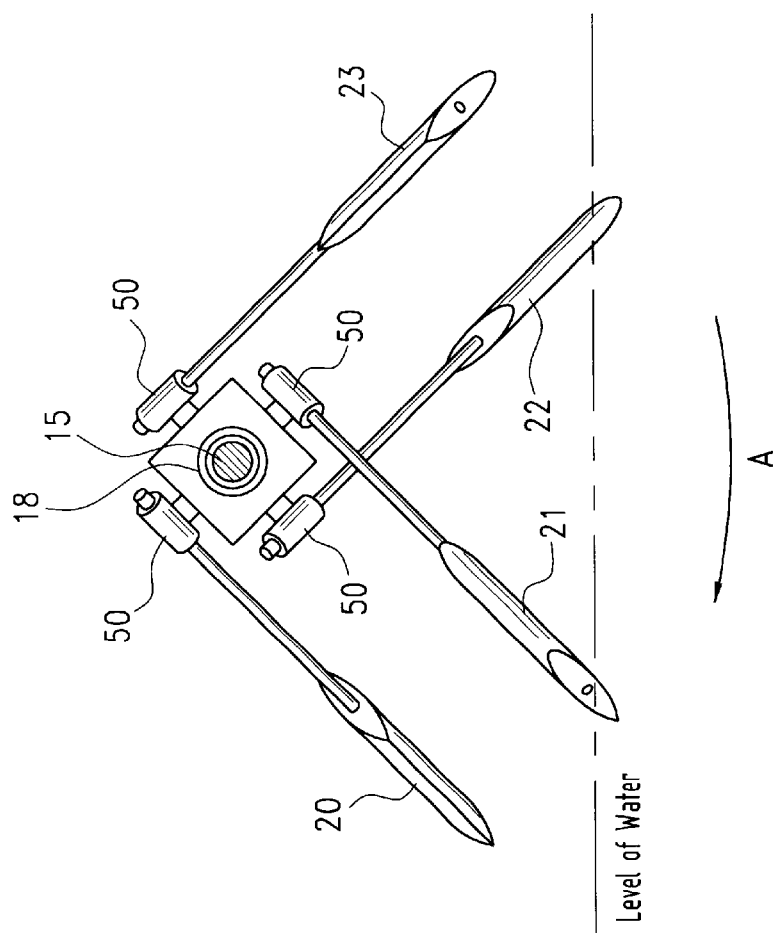
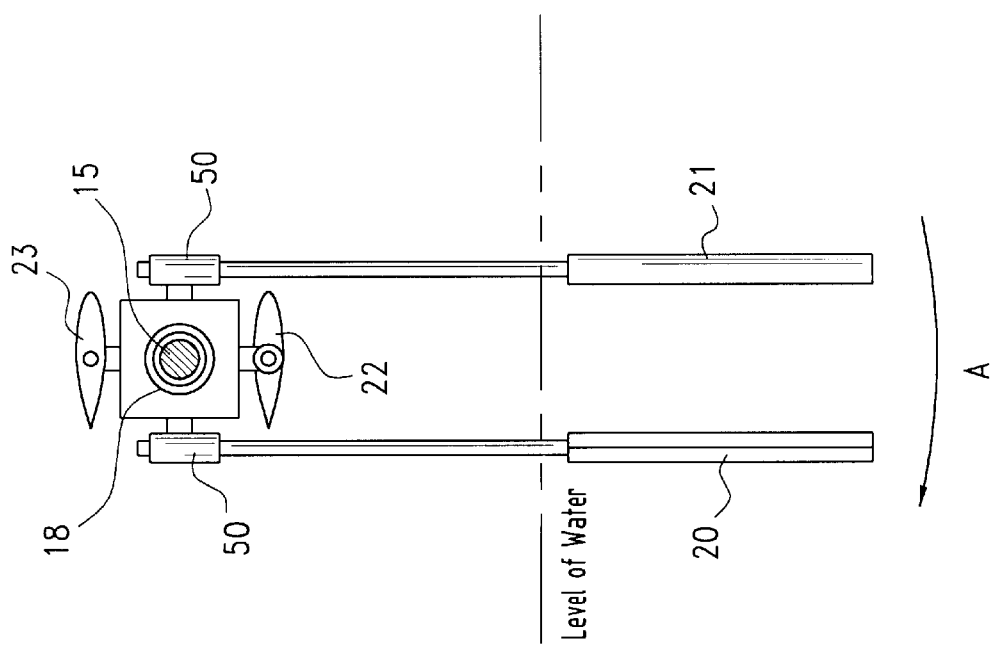

PROPULSION APPARATUS FOR MARINE VESSELS

1. CROSS-REFERENCE TO RELATED APPLICATIONS

The present application is a continuation-in-part of International application PCT/US 01/16526 filed on Jul. 17, 2001, now International Publication (PCT) No. WO 02/08054 A1 which was published under PCT Article 21(2) in English.

BACKGROUND OF THE INVENTION

1. Field of the Invention

This invention relates generally to improvements in propeller systems for developing a propulsive force, and more particularly, it pertains to a new outboard apparatus for propelling marine vessels, such as boats ships, etc.

2. Description of the Prior Art

Historically, various propeller and paddling apparatus have been developed for propelling different types of vehicles in water. While screw type propellers are one of the most common means for propelling boats and ships, such apparatus have a number of disadvantages. They have low efficiency because a lot of energy is lost in high speed screw propellers due to their friction with water, wake forming, vortices, cavitation, etc. The traditional outboard engines with screw propellers are plunged into the water and that creates a considerable braking force, especially when such engines are used for propelling small boats. Such engines are also relatively noisy, which may be undesirable in many situations, such as for fishing or pleasure boats, etc.

While the traditional propulsion paddling systems with reciprocating movement of the paddles, do not create any braking force, they also have low efficiency and the mechanization of such paddling systems is far too complicated to render them practical.

Many improvements of the screw propellers have been suggested throughout the years. Numerous patents and researches have been devoted to development of propeller systems wherein the propeller blades are pivoted simultaneously with rotation of the driving shaft and to the problem of optimizing such cyclic variations of the orientation of individual blades. Some of such systems utilize rotation of propeller blades or paddles not only around the axis of the driving shaft but also around complementary axes of rotation for more effective exertion of propulsive force. The basic concept presented in these systems is that the usable propulsive force is developed as a result of rotating the blades around two axes of rotation with variable orientation of the rotated blades relative to the driving shaft.

Propulsion apparatus are known (U.S. Pat. Nos. 1,284,282 to Fitzpatrick, U.S. Pat. No. 1,450,454 to Roney, U.S. Pat. No. 1,667,140 to Clark, U.S. Pat. No. 1,923,249 to Abram) wherein blades of feathering type extend radially from the driving shaft and are rotated around radial axes simultaneously with rotation of the driving shaft. In the paddling position, the blades are held in a plane parallel to the axis of the driving shaft and in the feathering position, the blades are held in a plane perpendicular to the axis of the driving shaft. A serious drawback of such systems is that, in the process of changing from one position to the other, the blades have to be rotated 90 degrees around their longitudinal axes with a considerable resistance of the fluid and low paddling and propulsion efficiency during such rotation. That is why such systems have low propulsion efficiency in comparison with screw type propellers.

There are also known propulsion apparatus wherein the propeller blades are oriented and rotated in the planes parallel to the driving shaft (U.S. Pat. No. 3,270,820 to Frazier, British patent No. 217,223 to Pensovecchio). Although having advantages in respect to the propellers with feathering blades, such apparatus with only two blades mounted in a plane perpendicular to the propeller shaft also have low efficiency and irregular power consumption. Different combinations of such propulsion apparatus are cumbersome and the mechanisms employed to effect their operations is complicated. For these reasons, a limited success has been obtained by such type of apparatus.

The present invention seeks to overcome the deficiencies of known propulsion systems and to benefit from the advantages that may be expected from the new method and apparatus.

The object of the invention is to provide a reliable propulsion apparatus for marine vessels, such as boats and ships with improved propulsion and energy efficiency.

BRIEF SUMMARY OF THE INVENTION

The invention is based on my discovery that an effective propulsive force in a liquid or gaseous fluid can be developed by rotating a driving shaft with four fluid moving means, such as blades or paddles, which are simultaneously rotated with the same speed around two intercrossed axes which are perpendicular to the axis of the driving shaft and to each other. Each fluid moving means is positioned and rotated in a plane generally parallel to the axis of the rotated driving shaft. The driving shaft and the fluid moving means are interconnected so that two of the fluid moving means are parallel to the axis of the driving shaft and are oriented in opposite directions, while the other two of the fluid moving means are parallel to an axis which is perpendicular to the axis of the driving shaft and are oriented in the same direction. Each two adjacent fluid moving means are rotated in different directions (clockwise and counterclockwise) in perpendicular planes. During such double rotations, the radial extensions of the fluid moving means relative to the driving shaft are changing as a function of the angle of rotation. As a result, the circumferential velocity and the speed of paddling motion of the fluid moving means is changing during each propulsion stroke in the water, resembling a fishtail or frog-leg action of the aquatic nature. Both sides of the fluid moving means are used consecutively as paddling surfaces.

In the preferred embodiment of the propulsion apparatus, a horizontal driving shaft with a rotated planetary gear-box is mounted on the stern of a boat over the surface of the water so as not to create any braking force for the moving boat. The gear-box includes four engaged bevel miter gears mounted on four radial shafts. A couple of additional planet bevel miter gears are also mounted on these radial shafts and are engaged with a sun bevel miter gear which is disposed coaxially to the hollow driving shaft. Four paddles mounted on the ends of the radial shafts are constrained by the planetary gear engagements to rotate with the same speed around the intercrossed axes of the driving shaft and the axes of the radial shafts. During these rotations, the positions of the paddles are changed from horizontal to vertical and, as a result, the paddles extend into the water wherein the propulsion force is developed. Circumferential velocities of the blades are gradually accelerated when they move downward during each propulsion stroke.

Simultaneously with the paddling process, the rotated paddles can work as blades of a double screw propeller if they are mounted with angles of incidence in the planes of rotation around the radial axes. Because the orientations of the fluid moving means relative to the longitudinal axis of the boat are changed during the rotation of the driving shaft, their angles of incidence must be variable.

The propulsion and energy efficiency of the typical outboard engines can also be improved by mounting in them the present propulsion apparatus instead of the traditional screw propellers. Two vertical driving shafts with the gear-boxes and the fluid moving means can be mounted in the extension case of the outboard engine and rotated in opposite directions for developing a unidirectional propulsive force.

BRIEF DESCRIPTION OF THE DRAWINGS

The objects and features of the present invention will become apparent from the following description taken in conjunction with preferred embodiments thereof with reference to the accompanying drawings, in which:

FIG. 4 is a schematic cross-sectional view on the lines IV—IV of FIG. 1.

FIG. 4a illustrates another schematic cross-sectional view on the lines IV—IV of FIG. 1, wherein the driving shaft is turned 45 degrees from the position of FIGS. 1 and 4.

DETAILED DESCRIPTION OF THE INVENTION

Figure 1:
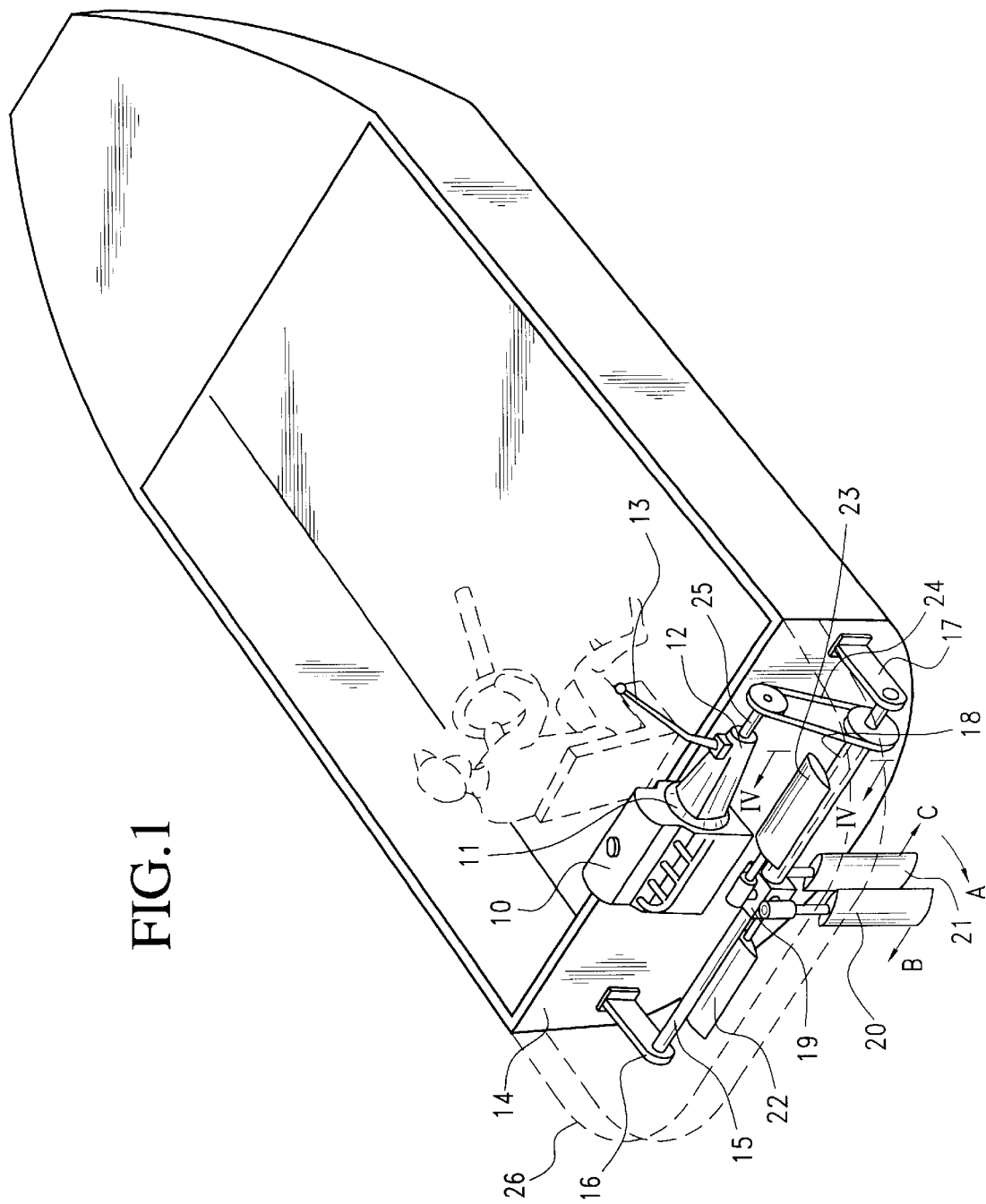
FIG. 1 is a schematic perspective view a preferred embodiment of an outboard propulsion apparatus mounted on the stern of a boat.

Referring to FIG. 1, an internal combustion engine 10 having a clutch 11 and a speed change gear-box 12 with a gear lever 13 is mounted on the stern of a boat 14. A support means 15 is fixed horizontally on the brackets 16 and 17. A hollow driving shaft 18 and a planetary gear-box 19 are connected with each other and rotatably mounted on the support means 15. Four paddles 20, 21, 22 and 23 are mounted on the planetary gear-box 19. A chain (or belt) transmission 24 connects the hollow driving shaft 18 with the driving shaft 25 of the engine 10. All the propulsion apparatus and the internal combustion engine 10 can be covered with a hood 26 (shown in dotted lines).

Figure 2:
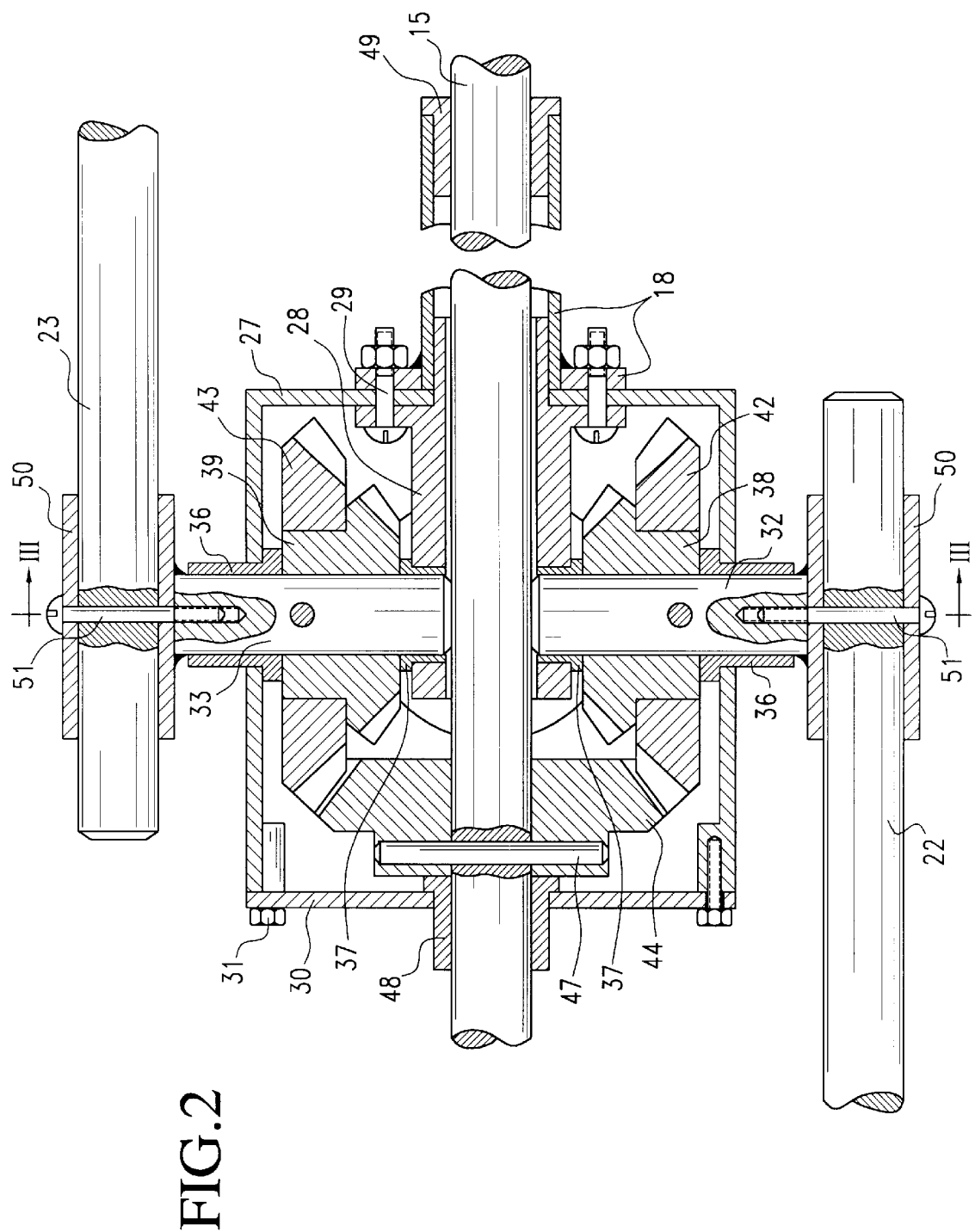
FIG. 2 is a cross-sectional view of a preferred design of the planetary gearbox on the lines II—II of FIG. 3.
Figure 3:
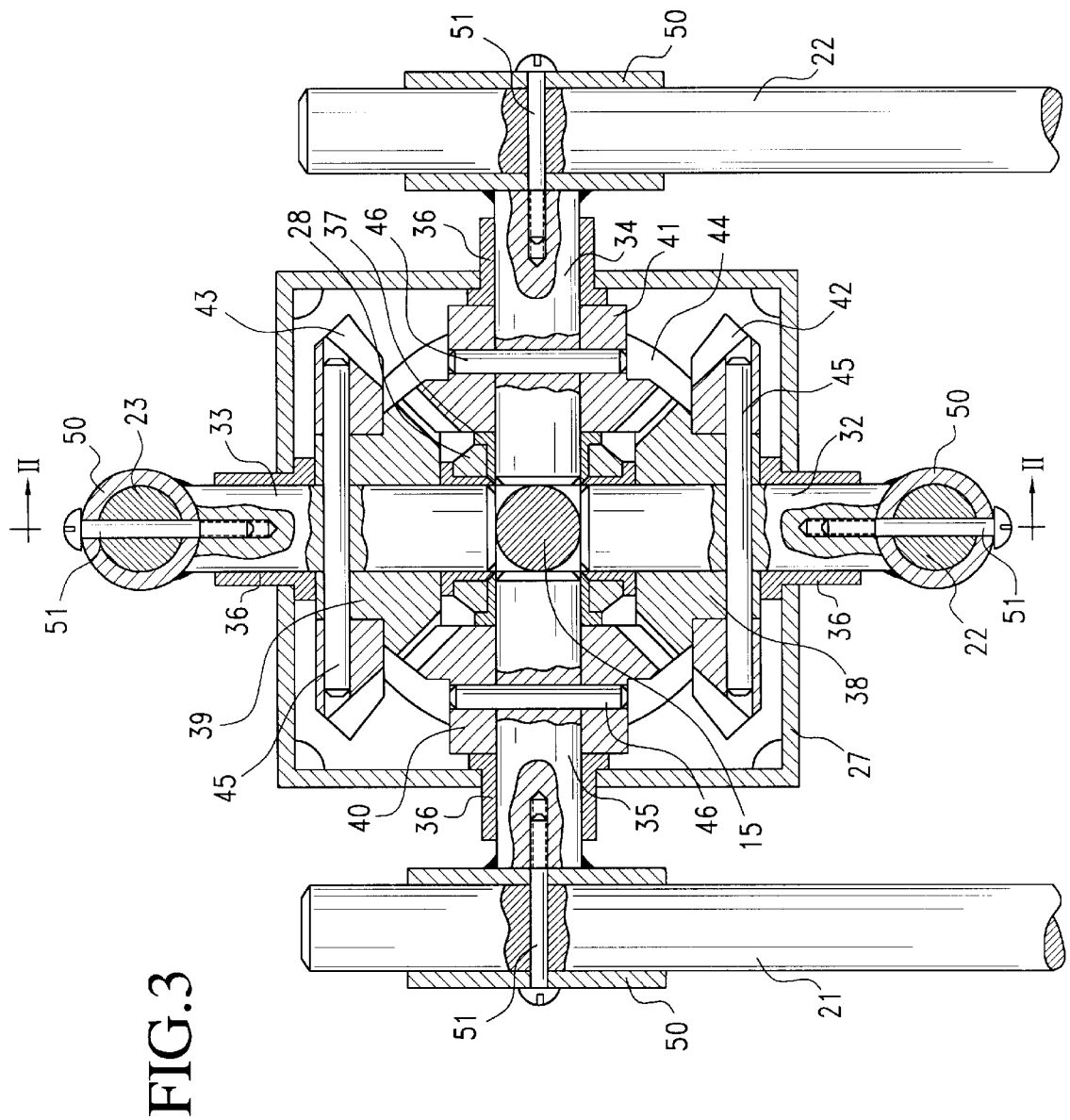
FIG. 3 is a cross-sectional view on the lines III—III of FIG. 2.

Referring now to FIGS. 2 and 3, a housing 27 of the planetary gear-box 19 includes a central hub 28 which can be made integrally with the housing (not shown) or fixed to the housing and to the hollow driving shaft 18 by the bolts 29. A lid 30 is fixed to the housing 27 by the screws 31. Four radial shafts 32, 33, 34, 35 are rotatably mounted in the bearings 36 and 37. Four identical bevel miter gears 38, 39, 40, 41 are mounted on these radial shafts so that the gears are engaged with each other. Additionally, two planet bevel miter gears 42 and 43 are mounted on the radial shafts 32 and 33, respectively, so that they are engaged with the sun bevel miter gear 44 which is mounted on the axial support means 15. The bevel miter gears are shown fixed on the radial shafts and on the support means by the pins 45, 46, 47. (Any other ways of fixing gears on shafts can be used). The driving shaft 18 with the planetary gear-box 19 is mounted rotatably on the axial support means 15 in the bearings 48 and 49. The gear-box 19 can be filled with a lubricating oil.

The paddles 20, 21, 22, 23 are mounted in the bushings 50 on the ends of the radial shafts and are fixed by the screws 51. In operation, when the hollow driving shaft 18 is rotated by the engine 10 through the chain or belt transmission 24, the paddles 20, 21, 22, 23 are constrained by the engagements of the bevel gears of the planetary gear-box 19 to rotate around the radial shafts 32, 33, 34, 35, respectively, with the speed of rotation of the hollow driving shafts 18. The paddles adjacent to each other in the perpendicular planes are rotated in opposite directions (clockwise and counterclockwise) not interfering with each other.

The propulsion apparatus is mounted on the stern of a boat 14 in such a position that the hollow driving shaft 18 with the planetary gear-box 19 is disposed over the level of water. Two of the paddles 20, 21 which are in generally vertical positions and oriented downward are plunged into the water (see FIG. 4), while the other two paddles 22 and 23 are oriented generally horizontally in opposite directions parallel to the hollow driving shaft 18. After the next 90 degrees of rotation of the driving shaft 18, two other paddles 22 and 23 are oriented vertically and are plunged into the water, while the paddles 20 and 21 are in horizontal positions parallel to the hollow driving shaft 18 (not shown).

FIG. 4a illustrates the position of the planetary gear-box 19 with the paddles 20, 21, 22, 22 after 45 degree rotation of the driving shaft 18 from the position shown in FIG. 4. In this position, the paddles 20, 21, 22, 23 are disposed generally over the surface of the water and not making any braking action for the movment of the boat. The paddles 20, 21, 22, 23 can be disposes in positions shown in FIG. 4a automatically under water pressure when the gear lever 13 of the speed change gear-box 12 is put in a neutral position.

For braking of the boat, the driving shaft 18 can be fixed in a position shown in FIG. 4 with the clutch 11 being disconnected or the engine 10 not working.

During the operation, the paddles smoothly enter into the water under acute angles with relatively low velocity. After that, circumferential velocity of the paddles is gradually accelerated because of increasing of radial extensions of them relative to the axis of the hollow driving shaft 18 when the orientations of the paddles are changed from horizontal to vertical positions. As a result of this acceleration, an additional propulsion force is developed in the water during each of the propulsion strokes.

During 360 degrees of rotation of the driving shaft 18, four propulsion strokes are developed with two paddles taking part in each propulsion stroke. Because the propulsion strokes follow one after another without interruptions after each 90 degrees of rotation of the driving shaft 18, a virtually permanent propulsion force is developed during each turn of the driving shaft 18.

Figure 5:
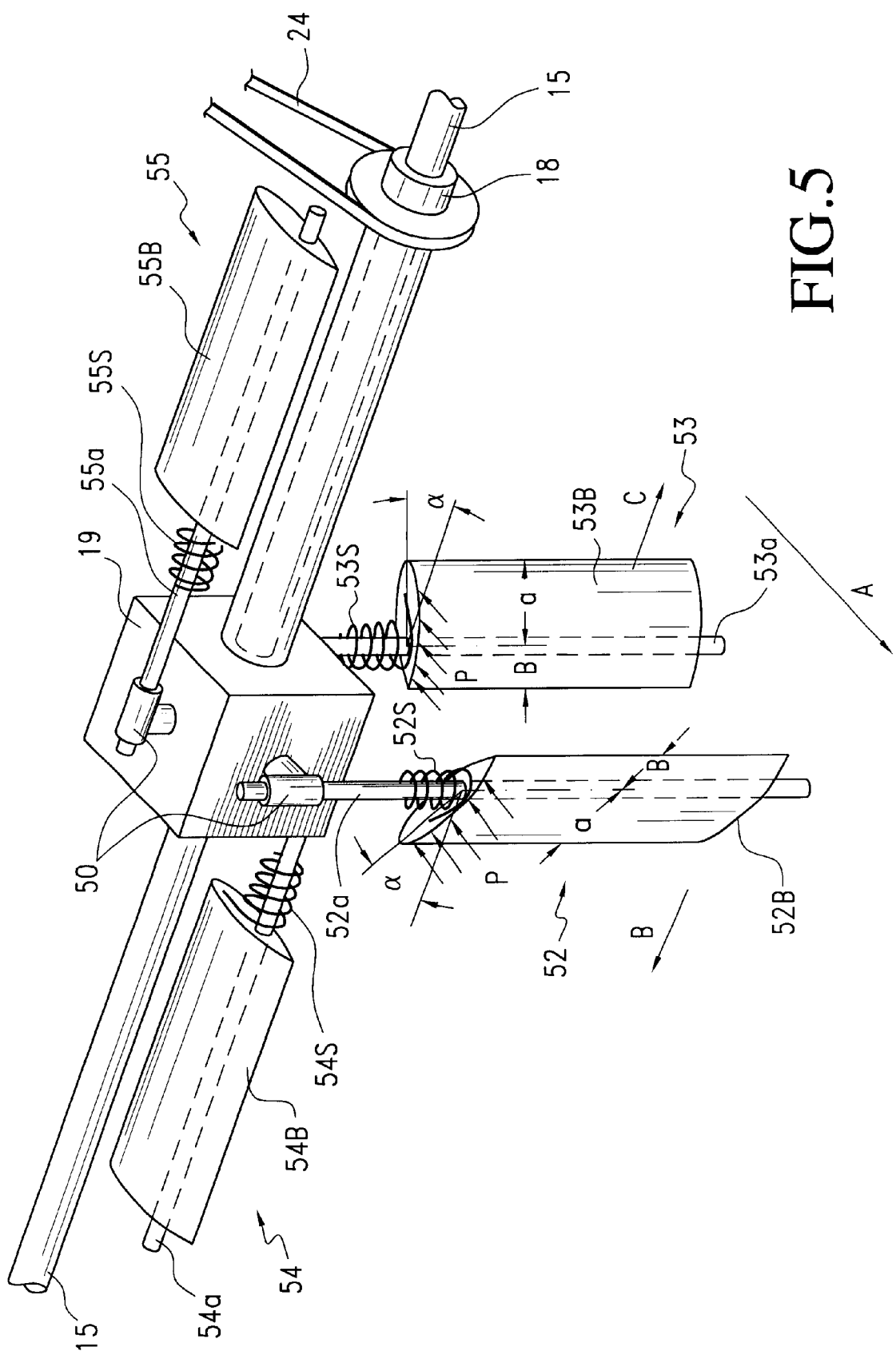
FIG. 5 is a schematic perspective view of the propulsion apparatus with alternative fluid moving means having blades with variable angles of incidence.

FIG. 5 illustrates the propulsion apparatus with an alternative design of the paddles mounted with variable angles of incidence α. Each of the paddles 52, 53, 54, 55 consists of an arm 52a, 53a, 54a, 55a and a blade 52b, 53b, 54b, 55b, respectively. The blades are mounted asymmetrically on the arms (the front part "a" is larger" than the rear part "b") and with the ability to swing around them. Torsion spiral springs 52s, 53s, 54s, 55s are mounted on the arms 52a, 53a, 54a, 55a, respectively. One end of each spring is fixed to the arm and another end is fixed to the blade. The springs are adjusted for keeping the blades 52b, 53b, 54b, 55b in the planes of rotation around the axes of the radial shafts 32, 33, 34, 35 when there is no external load on the blades. From this position, the blades can swing on the arms in both directions in limits restricted by the retainers (not shown). As shown in FIG. 5, when the paddles (54 and 55) are parallel to the driving shaft 18, the blades (54b and 55b) are disposed in generally horizontal planes. When the paddles (52 and 53) are in vertical positions, the blades (52b and 53b) are plunged into the water and are moved in the direction of the arrow A as a result of the rotation of the driving shaft 18. During this movement, the stronger force of water pressure "p" is applied to the larger front part "a" than on the smaller rear part "b" of the blades. As a result, the blades 52b and 53b are swung on the arms 52a and 533 respectively, overcoming the force of the torsion springs 52s and 53s. The angles of swinging can be controlled by the retainers (not shown). Because both sides of the blades are used consecutively as working surfaces, the angles of incidence α the blades are changed during each propulsion stroke. As a result of the double rotation around intercrossed perpendicular axes, both blades 52b and 53b not only move in the direction of arrow A, but also, simultaneously move relative to each other in the directions of arrows B and C. Having the angles of incidence α in the planes of rotations around radial axes, the blades work not only as paddles, but also as a double screw propeller.

Figure 6:
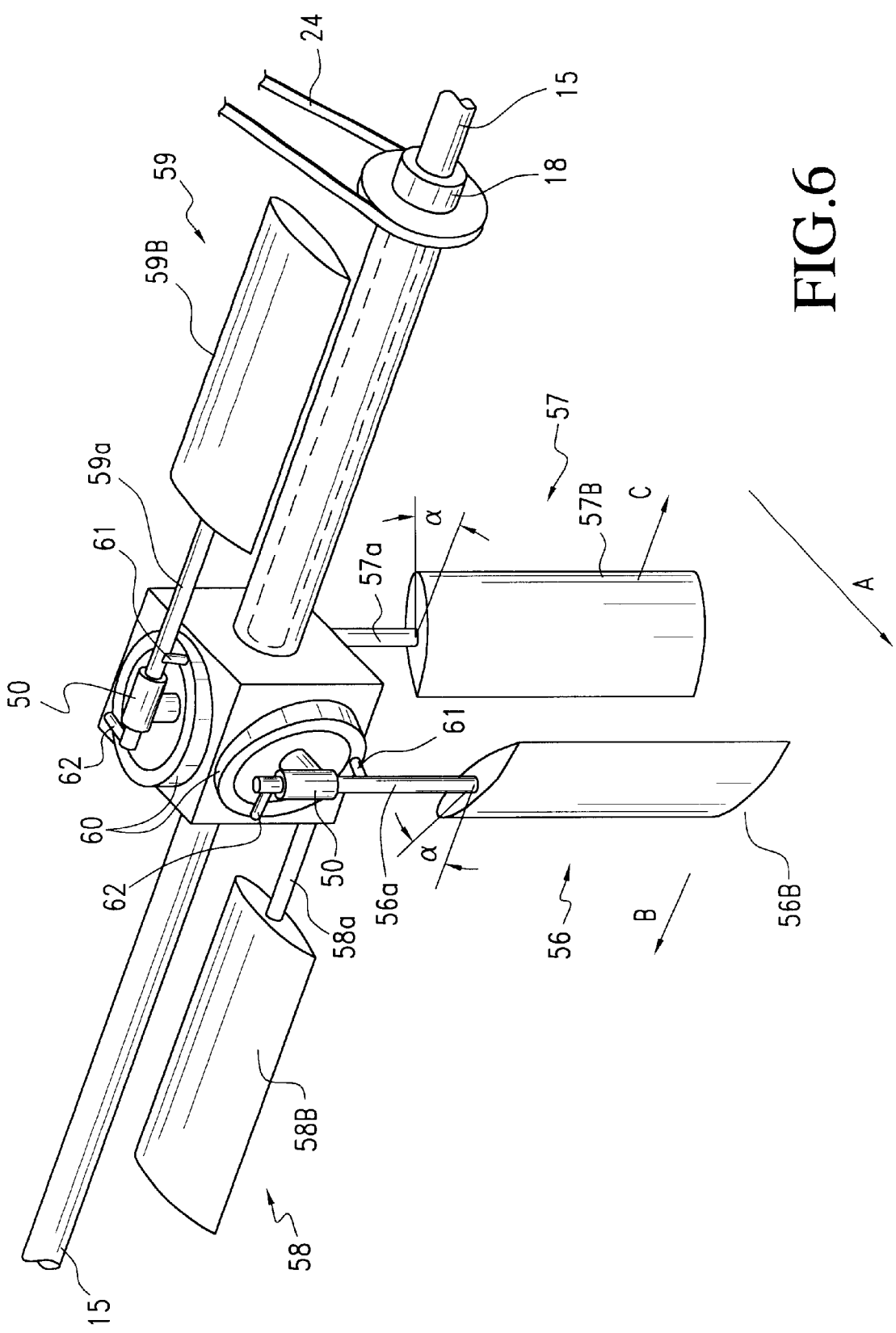
FIG. 6 is a schematic perspective view of the propulsion apparatus with another alternative fluid moving means having blades with variable angles of incidence which are changed by a cam system.

FIG. 6 illustrates the propulsion apparatus with another alternative design of the paddles 56, 57, 58, 59 having variable angles of incidence α of the blades. The blades 56b, 57b, 58b, 59b are fixed on the arms 56a, 57a, 58a, 59a which are rotatably mounted in the bushings 50. Four circular cams 60 are mounted on each side of the gear-box 19 coaxially to the radial shafts 32, 33, 34, 35 (only two circular cams 60 are shown) and the followers 61, 62 are fixed to each of the arms. The cams 60 are profiled so that during the rotation of the radial shafts, the angles of incidence α of the blades are changed in accordance to the positions of the paddles. In horizontal positions of the paddles (58, 56 in FIG. 6), the angles of incidence α of the blades (58b, 59b) are zero. When the paddles (56, 57 in FIG. 6) extend vertically downward and the blades (56b, 57b) are plunged into the water, the angles of incidence α are maximum.

Figure 7:
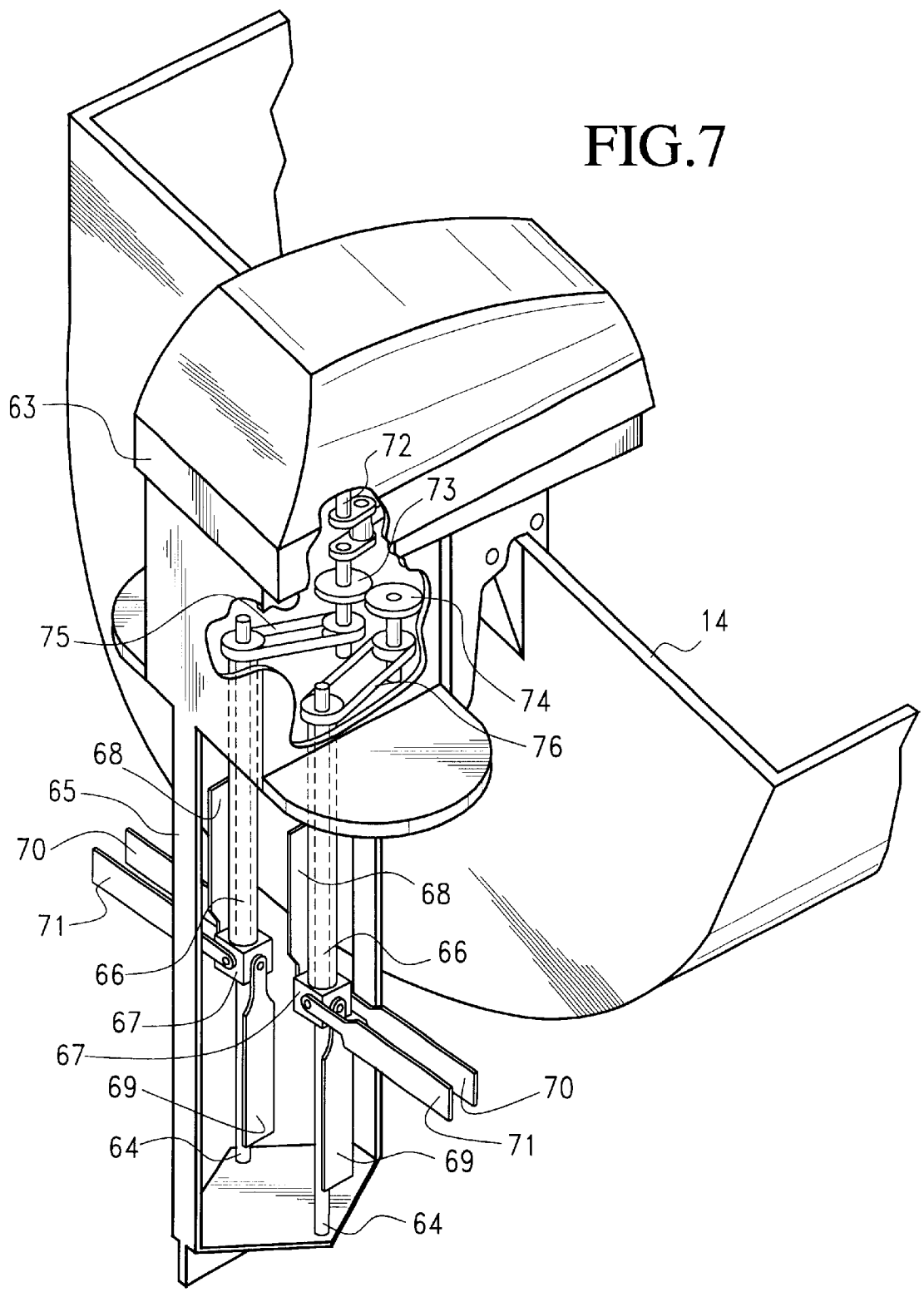
FIG. 7 is a schematic perspective view of another embodiment of an outboard propulsion apparatus including two vertical driving shafts with fluid moving means.

Referring now to FIG. 7, a perspective view of a typical outboard engine 63 is schematically shown wherein the invented propulsion apparatus is mounted instead of a traditional screw propeller. Two vertical support means 64 are fixed in the extension case 65 of the outboard engine. (The fixing of the upper parts of the support means 64 are not shown). Hollow driving shafts 66 with planetary gear-boxes 67 are rotatably mounted on these support means 64, which are simultaneously used for fixing sun gears of the planetary engagements (not shown) in the planetary gear-boxes 67. The propelling blades 68, 69, 70, 71 are mounted on each of these gear-boxes 67. The design of the planetary gear-boxes 67 is essentially similar to the design of the planetary gear-boxes 19. The propelling blades 68, 69, 70, 71 can also have variable angles of incidence as described in the embodiments of the propulsion apparatus shown in FIGS. 1–6.

In operation, the hollow driving shafts 66 are rotated in opposite directions by the crankshaft 72 of an internal combustion engine (not shown) through the gear engagement 73, 74 and chain (or belt) transmissions 75, 76.

The outboard engine is mounted on the stern of a boat 14 in any traditional manner.

While this invention has been described with reference to the structures disclosed herein, they are merely chosen and described to illustrate the principle, applications, and practical use of the invention to thereby better enable others skilled in the art to utilize this invention. The preferred embodiments of the present invention illustrated in FIGS. 1–7 are not confined to the details as set forth and are not intended to be exhaustive or to limit the invention to the precise form disclosed. For example, two (or more) rotated planetary gear-boxes can be mounted on the driving shaft with the possibility to develop eight (or more) propulsion stroke during each turn of the driving shaft. The invention is intended to cover any modifications, which may be variously practiced within the scope of the following claims or their legal equivalents, rather than by examples given.

What is claimed is:

1. A propulsion apparatus for propelling a vessel on water, including:
   at least one generally horizontal driving shaft;
   at least one gear-box mounted on said driving shaft and including four radial shafts disposed along two intercrossed axes that are generally perpendicular to the axis of said driving shaft and to each other;
   four fluid moving means mounted on said radial shafts and disposed generally in the planes of rotations around the axes of said radial shafts;
   and means for rotating said driving shaft together with said gear-box and said fluid moving means, wherein:
   said fluid moving means are constrained by said gear-box to rotate around said radial shafts with a speed of rotation of said driving shaft and being oriented so that two of said fluid moving means extend generally vertically downward, while the other two of said fluid moving means extend generally horizontally in opposite directions parallel to the axis of said driving shaft;
   said generally horizontal driving shaft with said gear-box being disposed over the level of said water so that said fluid moving means extend into the water when their orientations are changed from horizontal to vertical positions during said rotation.

2. The propulsion apparatus of claim 1, wherein:
   said gear-box includes four bevel mitre gears mounted on said radial shafts and engaged with each other, at least one additional planet bevel mitre gear mounted on at least one of said radial shafts, and at least one sun bevel mitre gear mounted on a support means coaxially with said driving shaft and engaged with said additional planet bevel mitre gear.

3. The propulsion apparatus of claim 2, wherein said driving shaft is hollow and said support means for said sun bevel mitre gear is mounted along the axis of that hollow driving shaft.

4. The propulsion apparatus of claim 3, wherein said hollow driving shaft is mounted on said support means.

5. The propulsion apparatus of claim 1, wherein said fluid moving means have variable angles of incidence in the planes of rotations around the axes of said radial shafts.

6. The propulsion apparatus of claim 5, wherein said fluid moving means have the ability to swing around axes perpendicular to the axes of said radial shafts for changing said variable angles of incidence.

7. The propulsion apparatus of claim 6, wherein said fluid moving means are disposed asymmetrically relative to said axes perpendicular to the axes of said radial shafts so that said fluid moving means are swung under pressure of the water for changing said angles of incidence.

8. The propulsion apparatus of claim 6, including a cam system for swinging said fluid moving means around said axes perpendicular to the axes of said radial shafts for changing said angles of incidence.

9. A marine vessel including a propulsion apparatus of claim 1.

10. An outboard engine for marine vessels, including:

two generally vertical driving shafts;

two gear-boxes mounted on said two generally vertical driving shafts, each of said two gear-boxes including four radial shafts disposed along two intercrossed axes that are generally perpendicular to the axes of said driving shafts and to each other, four fluid moving means mounted on said radial shafts and disposed generally in the planes of rotations around the axes of said radial shafts;

and means for rotating said two driving shafts in opposite directions, wherein:

said fluid moving means are constrained by said gear-boxes to rotate around said radial shafts with the speed of rotation of said driving shafts and being oriented so that two of said fluid moving means extend generally horizontally in the same direction, while the other two of said fluid moving means extend generally vertically in opposite directions parallel to the axes of said driving shafts.

11. The outboard engine of claim 10, wherein:

each of said gear-boxes includes four bevel mitre gears mounted on said radial shafts and engaged with each other, at least one additional planet bevel mitre gear is mounted on at least one of said radial shafts, and at least one sun bevel mitre gear is mounted on a support means coaxially with each of said driving shafts and is engaged with said additional planet bevel mitre gear.

12. The outboard engine of claim 11, wherein said driving shafts are hollow and said support means for said sun bevel mitre gears are positioned along the axes of said hollow driving shafts.

13. The outboard engine of claim 12, wherein said hollow driving shafts are mounted on said support means.

14. The outboard engine of claim 10, wherein said fluid moving means have variable angles of incidence in the planes of rotations around the axes of said radial shafts.

15. The outboard engine of claim 14, wherein said fluid moving means have the ability to swing around the axes perpendicular to the axes of said radial shafts for changing said variable angles of incidence.

16. The outboard engine of claim 15, wherein said fluid moving means are disposed asymmetrically relative to said axes perpendicular to the axes of said radial shafts so that said fluid moving means are swung under pressure of the water for changing said variable angles of incidence.

17. The outboard engine of claim 15, including cam systems for swinging said fluid moving means around said axes perpendicular to the axes of said radial shafts for changing said variable angles of incidence.

* * * * *